March 10, 1925.  
E. H. BREMER  
AUTOMOBILE GATE  
Filed Nov. 9, 1923

E. H. Bremer,
Inventor

Witnesses:

By
Attorney

March 10 1925.  
E. H. BREMER  
AUTOMOBILE GATE  
Filed Nov. 9, 1923
1,529,460
2 Sheets-Sheet 2
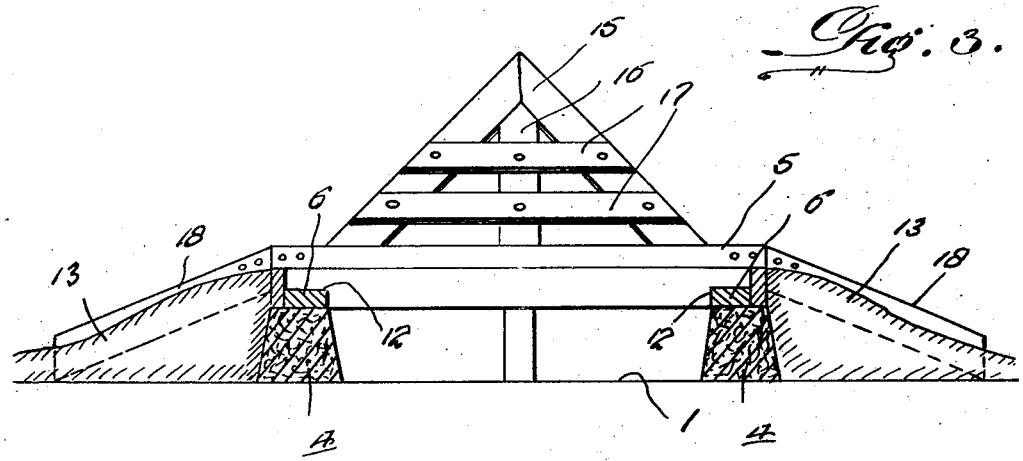
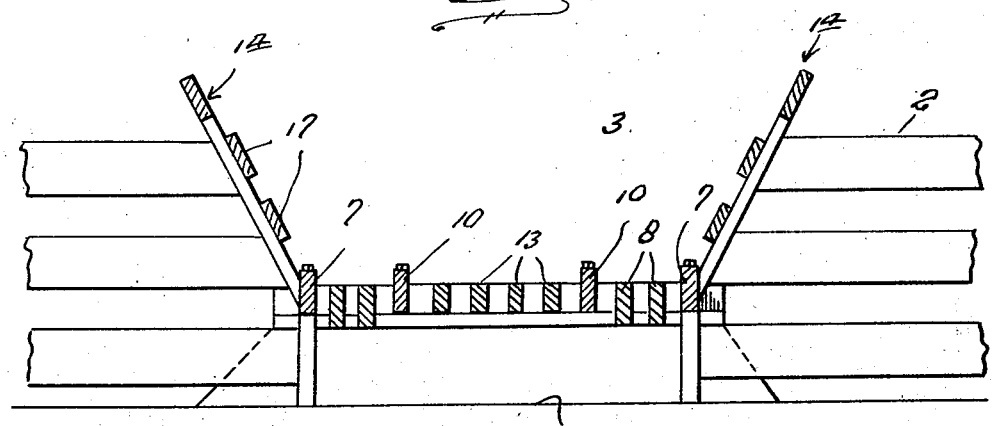
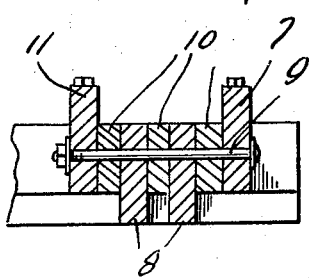

Patented Mar. 10, 1925.

1,529,460

UNITED STATES PATENT OFFICE.

ELLIS H. BREMER, OF GARDEN GROVE, IOWA.

AUTOMOBILE GATE.

Application filed November 9, 1923. Serial No. 673,776.

*To all whom it may concern:*

Be it known that I, ELLIS H. BREMER, citizen of the United States, residing at Garden Grove, in the county of Decatur and State of Iowa, have invented certain new and useful Improvements in Automobile Gates, of which the following is a specification.

This invention relates to gate structures and particularly to a type of gate which is normally open to permit the passage of automobiles at all times and which is constructed so as to prevent the passage of cattle or other animals therethru.

An object of the invention is to provide a normally open gate in a fence line adapted to permit the passage of automobiles which includes a platform elevated above the ground and formed of a plurality of spaced bars arranged perpendicularly to the fence line, so that an automobile may pass over said platform on the bars longitudinally thereof, and which will effectively prevent cattle or other animals from passage through the fence as they will be unable and afraid to walk on said slotted platform.

Another object of the invention is to provide a platform elevated above the ground in a fence line, having bars arranged in spaced relation and at right angles to the direction of said fence line, certain of said bars being arranged to form track portions for the wheels of an automobile, and side members secured to each side of said platform and extending upwardly above the fence, slight inclines being provided at each end of said platform so that an automobile may ride up said inclines and over the platforms to pass through the fence, the wheels thereof riding on the track portions formed by the bars of the platform, and whereby cattle will effectively be prevented from passing through the fence, through their inability to walk on the spaced bars.

Other objects of the invention and the details of construction forming the preferred form of this invention are specifically and clearly set forth in the following description and claim, it being understood, however, that slight variations in the form or details of construction will not depart from the object and scope of this invention as herein set forth.

The invention is clearly illustrated in the accompanying drawings, in which,—

Figure 3 is a sectional view on the line 3—3 of Figure 1.

Figure 4 is a transverse sectional view of the gate showing the fence attached thereto, and Figure 5 is a detail sectional view showing the manner of securing and holding the track forming bars of the gate.

Figure 1:
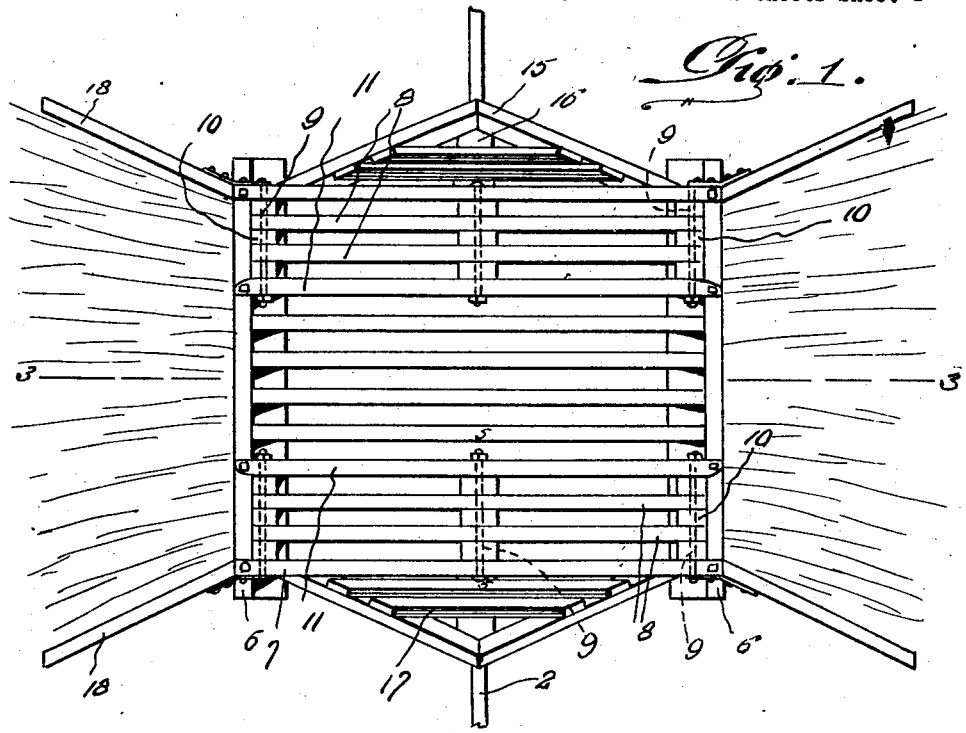
Figure 1 is a plan view of the improved gate.
Figure 2:
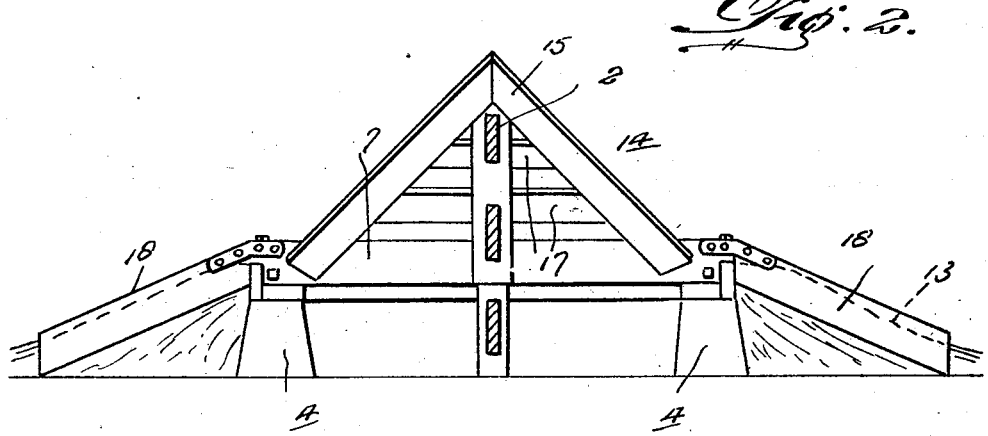
Figure 2 is a side elevation thereof.

1 indicates the surface of the field provided with a cross fence 2 fencing off a portion of the field against the entrance of cattle, and 3 indicates an opening in said fence in which is arranged my improved form of gate including piers 4 arranged in spaced relation on each side of the opening in the fence and in line therewith.

A platform generally indicated at 5 is mounted on the piers 4 and includes a pair of angle members 6 mounted on the tops of the piers and connected at the ends by side bars 7. Arranged within and adjacent each side bar are a plurality of track forming bars 8 arranged in spaced relation with each other and said side bars and parallel therewith, secured at their end and intermediate portions to the side bars by bolts 9 which extend through said bars and spacing members 10 for securing said bars in track forming relation with the side bars and a pair of bars 11. The upper edges of the bars 7 and 10 are located about the upper edges of the bars 6 and 8, so that each of the bars 7 and 10 form side bars for the track bars, the track bars 8 having the ends morticed as indicated at 12 to receive the lower flange of the members 6 so that the upper edges of these bars are positioned in the same plane as the upper edges of the angle members 6. Connecting the members 6 and between the bars 10 are mounted a plurality of slot members 13 are arranged in spaced relation with each other and with the bars 10 completing the main platform construction.

Mounted on each side of the platform and secured to the side bars thereof are side forming members 14 each having a pair of angularly arranged members secured together at their upper ends as indicated at 15 and the vertical strip 16 connected by cross strips 17, the lower ends of the angle members 15 and the vertical strip 16 being secured to the strips or side bars 7 of the platform. These side members are also secured to the fence as clearly indicated in Figures 1 and 4, and form a guard to prevent access to the platform from the side. A pair of inclined bars 18 are secured at each end of the platform to the side bars 7 as clearly indicated in Figure 1, and diverge therefrom to terminate the approach to said platform. This approach which is indicated at 13 is formed in any suitable manner, preferably by filling in soil against the piers 4, and sloping it off from the upper edge of the member 6 of the platform to the surface of the ground 1 for the purpose of permitting an automobile to ride up an incline and onto the platform 5, in order that the same may pass over said platform and through the fence.

It will be apparent from the foregoing description that the new form of gate is always open for the passage of automobiles, the wheels of which will ride up the incline 13 onto the track bars 8 between said bars 7 and 10 and pass through the opening 3 in the fence from one field to the other. It will also be apparent that an animal in the one field attempting to pass through the opening 3 will be unable to cross the platform 5 on account of the bars being spaced apart and elevated above the ground so that the animal will be unable to obtain sufficient footing to cross from one pier to the other or from one end of the platform to the other, and also because the open nature of the platform permits the animal to see through the platform to the ground below for acting on the animal's senses so that he will not attempt to cross the platform. By securing the track bars 8 and the bars 7 and 11 together by the bolts 9 with the spacing members for holding them in spaced relation, a rigid track structure is formed for effectively overcoming any natural resiliency of the bars in a transverse direction and for preventing said bars from separating under the weight of the automobile as it passes thereover.

What I claim as new is:

A gate of the class described including a pair of piers arranged in spaced relation at opposite sides of an opening in a fence, a platform mounted on said piers and having angle members connected together at their ends by side members extending above said angle members, a pair of bars corresponding to said side bars arranged in spaced relation therewith and extending above the angle members, a plurality of bars arranged in spaced relation between the last named bars and the side bars, spacing members for holding said bars in spaced relation with respect to the side bars and the second mentioned bars, means for securing all of said bars together to form vehicle track sections at each side of the platform, a plurality of spaced bars connecting said angle members parallel with the side bars and arranged in the space between the track forming members, side members secured to the side bars and the fence and inclined approaches to the ends of said platform whereby vehicles may pass through the openings in said fence over said platform, the wheels riding in said track section and cattle are prevented from passing through the opening in said fence by the spaced relation of the bars in the platform.

In testimony whereof I affix my signature

ELLIS H. BREMER